United States Patent [19]

Born et al.

[11] 4,074,175
[45] Feb. 14, 1978

[54] INDUCTIVE LOAD CURRENT MEASURING CIRCUIT

[75] Inventors: Norman E. Born; Edwin E. Kolatorowicz, both of Erie, Pa.

[73] Assignee: General Electric Company, Erie, Pa.

[21] Appl. No.: 677,195

[22] Filed: Apr. 15, 1976

[51] Int. Cl.² .............................................. H02P 5/00
[52] U.S. Cl. ................................... 318/332; 318/317; 318/432; 318/434; 318/536; 318/537
[58] Field of Search ............... 318/317, 332, 331, 432, 318/434, 536, 537, 503

[56] References Cited

U.S. PATENT DOCUMENTS

| | | | |
|---|---|---|---|
| 3,142,800 | 7/1964 | Miller | 318/432 |
| 3,284,688 | 11/1966 | Black | 318/332 |
| 3,566,237 | 2/1971 | Moore et al. | 318/341 |
| 3,675,105 | 7/1972 | Petrigalla | 318/356 |
| 3,764,872 | 10/1973 | Boice | 318/332 |
| 3,809,984 | 5/1974 | Hoge | 318/332 |
| 3,936,709 | 2/1976 | Wright | 318/341 |
| 3,947,738 | 3/1976 | Oliver | 318/356 |

FOREIGN PATENT DOCUMENTS 18,483  7/1969  Japan .................... 318/341

Primary Examiner—Robert K. Schaefer
Assistant Examiner—Eugene S. Indyk
Attorney, Agent, or Firm—Arnold E. Renner; Philip L. Schlamp

[57] ABSTRACT

A circuit for generating a signal proportional to the average current of an inductive load supplied from a supply of intermittent electrical power and having a free-wheeling path through which load current flows during periods in which the load is not connected to the power supply, includes means to provide a first signal which is a function of the current in the free-wheeling path and second means to provide a second signal which is a function of the supply-load current. By appropriately combining the two signals an output proportional to the average load current is obtained. The output signal can be utilized for control functions such as controlling the operation of switching devices which, in turn, control the application of electrical power to a d.c. motor.

18 Claims, 8 Drawing Figures

INDUCTIVE LOAD CURRENT MEASURING CIRCUIT

BACKGROUND OF THE INVENTION

The present invention relates generally to the measurement of the current of an electrical load and more particularly to the production of a signal proportional to the average current of an inductive load supplied intermittently with electrical power when the load is provided with a free-wheeling current path.

It is often desirable to measure or monitor the average current of a load in order to provide a feedback signal which may be utilized to provide some control function. For example, adjustable speed d.c. motor drives are often required to operate in a constant horsepower mode. In this mode, the field is normally maintained at some nominal maximum strength until the rated motor armature voltage is reached. An increase of speed results in an increasing armature voltage. When a point called "crossover" is reached, the strength of the motor field is reduced to further increase speed. Crossover may be a level of armature terminal voltage or counter emf (CEMF). If CEMF is used, a signal proportional to armature voltage is summed with a signal proportional to armature current (with proper polarities) to derive a signal proportional to CEMF.

In systems of the type generally described above, one common practice was to use a rectifier circuit employing one or more thyristors to control the field current. Below crossover, the current would be held essentially full on and the field voltage would be a constant times the a.c. input voltage. As such, the field current will vary inversely as the field resistance and directly as the a.c. input voltage. In this situation, if the a.c. input voltage were high and the motor field were cold, the field current could be excessively large and the field could be excessively strong. To increase speed to some level above crossover requires a greater field current change than if the field current started from a more modest level. This is due to the presence of saturation. Since the field circuit is highly inductive and time is required to decrease the field current, the dynamic performance of the system in this situation tends to be degraded.

An additional feature often included in many prior art systems is a minimum field adjustment utilized to limit the field current undershoots and, therefore, speed overshoots. This adjustment normally involves a minimum to which the thyristors can be adjusted in phase retardation. Again, the actual field strength is directly proportional to the a.c. input voltage and inversely proportional to the field resistance. Here, if the drive system is adjusted while the field is hot with a minimum field setting very near to the actual current required at top speed, it might be impossible to reach the top speed when the field is cold.

From the above discussion the desirability of being able to provide an accurate feedback signal proportional to the current through a load such as a motor field is apparent. In many instances the provision of such a feedback signal presents no problem. For example, in the case of a d.c. motor supplied from a diode rectification bridge it is a relatively simple matter, utilizing a transformer, to measure the current on the a.c. side of the bridge and to assume, with accuracy, that the d.c. current on the load side of the bridge will be proportional to the a.c. current. There are, however, many instances in which power is not continuously applied to the load but is supplied thereto intermittently. This is particularly true in the control of motors. In motor controls it is quite common to employ a system utilizing switches, such as thyristors, to connect the motor to a power source such as an a.c. line or a battery. The percent of on time to off time governs the amount of power supplied to the motor. In many of these applications the motor is provided with what is commonly called a free-wheeling path which path provides a circuit through which the load current may flow during periods when the load is not connected to the source. Because load current will exist during periods when the load is not connected to the source, it is apparent that a measurement on the a.c. side of the switching devices will not provide an accurate representation of the average load current.

Direct measurement of the d.c. current has not heretofore been practical or has been very expensive. Devices such as Hall Effect devices in series with the load are known but are expensive and difficult to maintain with accuracy. A sensing component such as a resistor used in conjunction with a differential input amplifier is normally not satisfactory since it is not feasible to have enough voltage drop in the resistor in comparison to the common mode voltage. That is, the normal voltage across the load is very large compared to deviations therein and the use of a dropping resistor of a resistance great enough to develop a significant voltage results in wasted power and associated heat problems. The use of a conventional current transformer in a system employing a free-wheeling path in the a.c. side has been discussed and the use of a similar transformer in series with the load is not satisfactory inasmuch as the current through the load is primarily d.c. with a very low ripple content and the transformer is incapable of transforming the d.c. component of the load current.

SUMMARY OF THE INVENTION

It is, therefore, an object of the present invention to provide an improved circuit for measuring the average current of an inductive load.

It is another object to provide an improved circuit for providing an output signal proportional to the average current of an inductive load which is provided with a free-wheeling current path and which is supplied with electrical power from an intermittent power supply.

It is a further object to provide a current feedback signal for the control of an electric motor.

It is a still further object to provide an improved motor control system employing a current feedback signal proportional to the average motor field current when the motor is intermittently supplied with electrical power.

It is an additional object to provide an improved control system for a d.c. shunt motor through the use of a feedback path providing a signal proportional to the average motor field current when the field is shunted by a free-wheeling current path.

It is still another object to provide an improved system for monitoring the average current of an inductive load, having a free-wheeling path, which employs readily available components and is easily implemented.

The foregoing and other objects are achieved in accordance with the present invention by providing, in a system for an inductive load which is supplied power intermittently and which has a free-wheeling path, means to produce a first signal which is a function of the current in the free-wheeling path. An additional means supplies a second signal which is a function of the current furnished to the load from the supply. These two signals are appropriately combined to provide an output signal which is proportional to the average current through the load.

BRIEF DESCRIPTION OF THE DRAWING

While the present invention is defined in particularly in the claims annexed to and forming a part of this specification, a better understanding thereof can be had by reference to the following description taken in conjunction with the accompanying drawing in which:

DETAILED DESCRIPTION

Figure 1:
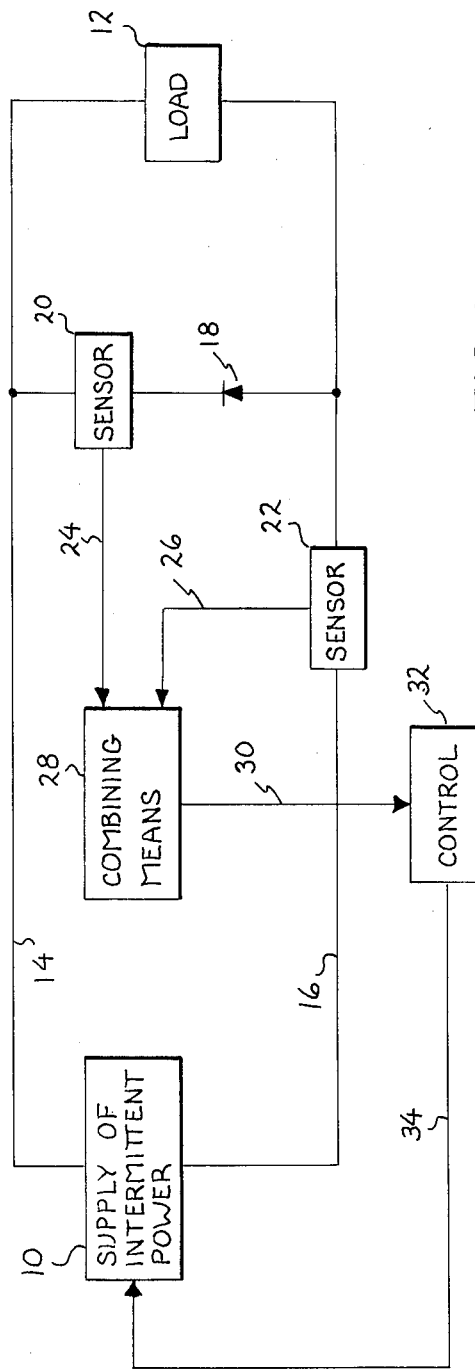
FIG. 1 is a high level block diagram showing the generic configuration of the present invention with respect to a supply of electrical power and a load.

Referring now to FIG. 1, there is shown in block diagram form the present invention in its generic or general form. As illustrated, block 10 represents a supply of intermittent power which for purposes of this description could include the actual source of power (e.g., an a.c. line or a battery) as well as suitable switching means to selectively connect the load to the source. Supply 10 is connected to an inductive load 12 by way of a pair of conductors 14 and 16. A free-wheeling path is provided in parallel with the load and includes a diode 18 poled in a direction to conduct load current when the supply 10 is not furnishing power to the load all in a manner well known in the art. A first sensing means 20 is also included within the free-wheeling path. A second sensing means 22 is associated with the conductor 16 to sense or measure the supply-load current. Lines 24 and 26 connect, respectively, output signals from the two sensors 20 and 22 to a combining means 28. Signals appearing on lines 24 and 26 will be a function of the currents sensed in the two paths and the combining means 28 combines these two signals to provide its output signal via line 30 to a control 32. Control 32 will output a suitable signal to the supply 10 via line 34 to control the supply 10. The nature of the signal on line 34 will be appropriate to configuration of the supply 10 but may be, for example, a voltage signal utilized to control the application of gating signals to the gating electrodes of thyristors to render those thyristors conductive at appropriate times.

Figure 2:
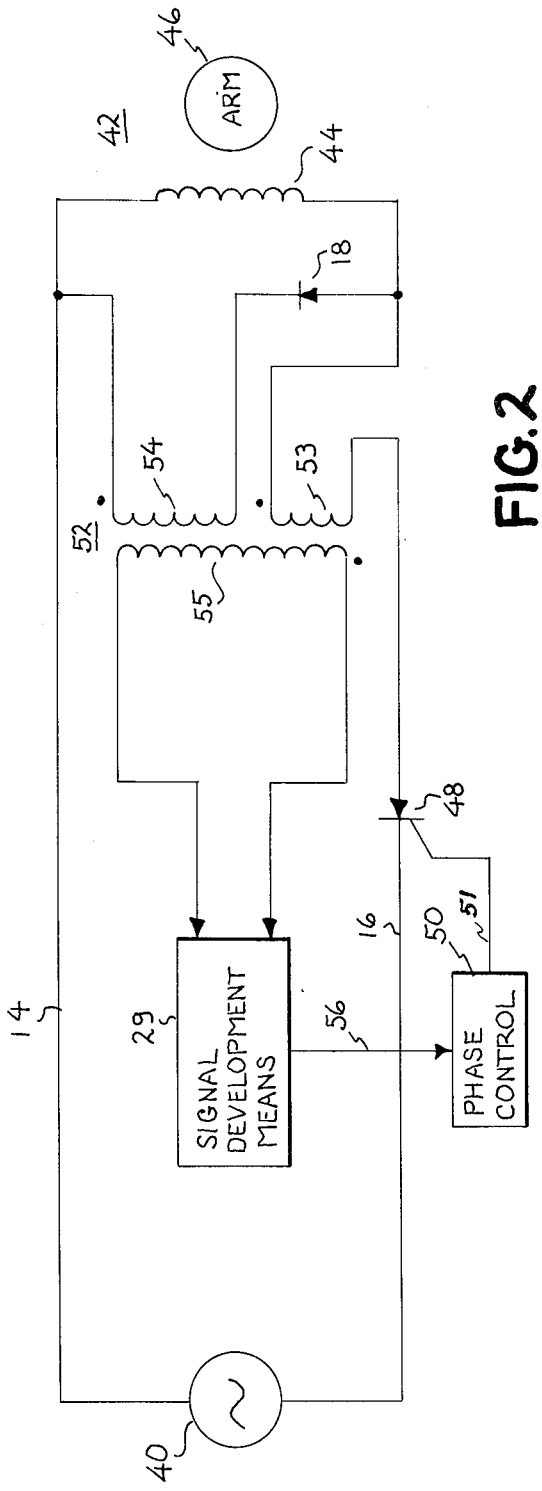
FIG. 2 is a schematic diagram, partially in block form, illustrating the present invention in its preferred embodiment as applied to a half-wave field supply for a d.c. shunt motor.

FIG. 2 illustrates the present invention in its preferred embodiment as applied to what is commonly called a half-wave field supply. In FIG. 2 there is shown a source of alternating current 40 which supplies field power to a d.c. shunt motor indicated generally at 42. Motor 42 has a field winding 44 and an armature 46. As illustrated and as is customary in the art, the amount of power furnished to the field winding 44 of the motor 42 is controlled by a suitable switching device shown in FIG. 2 as a thyristor 48 which receives, at its gating terminal, a signal by way of a line 51 from a state-of-the-art phase control 50. The amount of power delivered from the source 40 to the field winding 44 is a function of that portion of the positive half-cycle of the source 40 during which the thyristor 48 is rendered conductive. In series circuit with the field winding 44 and the thyristor 48 is a first primary winding 53 of a current transformer 52. Thus, it is seen that load current is delivered from the alternating source 40 via line 14 to the field winding 44 and from that winding by way of the primary winding 53, thyristor 48 and conductor 16 back to the source 40.

As was the case in FIG. 1, the free-wheeling path including a diode 18 is provided to conduct the load current, in this case the field current, when the thyristor 48 is in its nonconducting state. Included within the free-wheeling path is a second primary winding 54 of the transformer 52 such that, in the free-wheeling mode of operation, current circulates in the path comprising the field winding 44, diode 18 and primary winding 54. It is noted that, as indicated by the dots, the two primary windings are connected, with respect to a secondary winding 55 of the transformer 52, in opposition for reasons which will be more fully understood as this description proceeds. The signal induced into the secondary winding 55 by the two currents in the primaries 53 and 54 is provided to a signal development means 29 which utilizes the output of the secondary winding 55 to produce, on a line 56, the signal to phase control 50. The phase control 50, as was previously indicated, controls the conduction time of the thyristor 48. In accordance with the preferred embodiment of the invention the signal on line 56 will be a voltage signal the magnitude of which is proportional to the average load current; i.e., the average current of the field winding 44 of the motor 42. Phase control 50 may be any of those well known in the art which responds to the signal on line 56 to control the gating on of the thyristor 48 and hence control the current within the field winding 44 by determining the amount of time that that winding is connected to the source 40.

Figure 3:
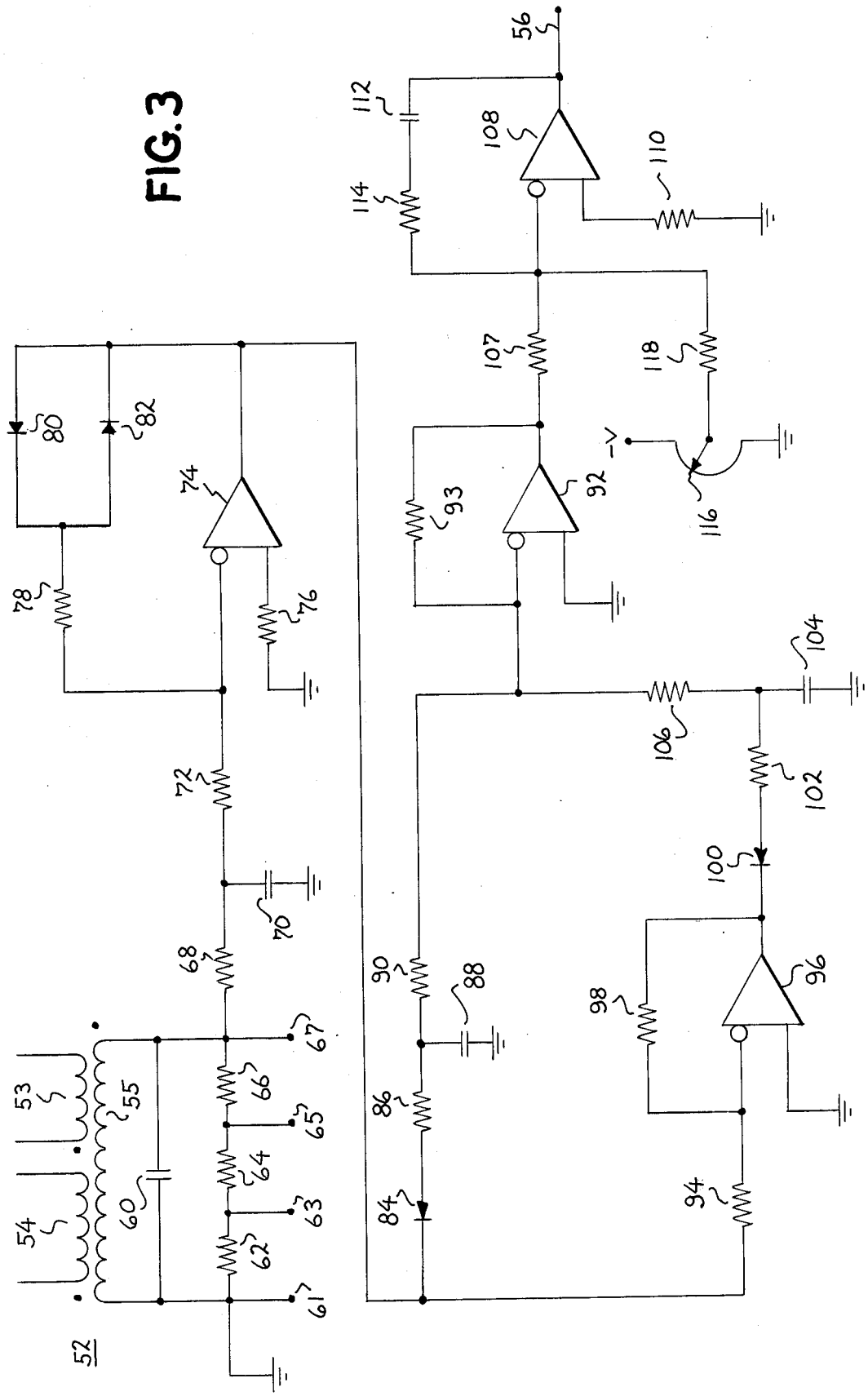
FIG. 3 is a schematic diagram illustrating in detail a portion of the circuit of FIG. 2 shown in block form.

FIG. 3 illustrates the preferred embodiment of the signal development means 29 illustrated in block form in FIG. 2. It further illustrates the connection of this means to the transformer 52 of that figure and these two items constitute what in FIG. 1 were generally referred to as the sensing and combining means. Referencing now FIG. 3, the two primaries 53 and 54 and secondary 55 of the transformer are shown. Primaries 53 ad 54 are connected in opposition primarily to prevent the transformer from saturating. It should further be noted that the primaries 53 and 54 do not necessarily have the same number of turns and the turns may vary on these windings to enhance the linearity between the average output voltage and the average field current. In one example, it was found desirable to place approximately twice the number of turns on the free-wheeling primary, that is primary 54, as on the power primary 53.

In FIG. 3 one end of the secondary winding 55 is connected to ground and a capacitor 60 is connected in parallel 61, 63, with the secondary winding for transient spike attenuation. Also connected in parallel with the secondary winding 55 are three resistors 62, 64 and 66. The three resistors 62, 64 and 66 are scaling resistors and are provided with terminals 61, 63 65 and 67 such that by jumpering various combinations of these resistors, appropriate scaling can be achieved. The output or ungrounded side of the secondary winding 55 is connected by way of a scaling resistor 68 and an input resistor 72 to the inverting input of an operational amplifier 74. Further spike attenuation is achieved by the inclusion of a capacitor 70 connected between the junction of the two resitors 68 and 72 and ground. Operational amplifier 74 acts in an amplifying mode and, as such, has its noninverting input connected to ground by way of a suitable resistor 76 and is further provided with a feedback path between its output and its inverting input. This feedback path includes a resistor 78 and a pair of antiparallel connected diodes 80 and 82. Diodes 80 and 82 are included to compensate for the voltage drop in diodes which appear subsequently in the circuit in a manner well known in the art.

The output of amplifier 74 will be a signal having relatively positive and negative going portions in accordance with which of the two primaries 53 and 54 is carrying current at the particular time. The output of the amplifier 74 is directed along two paths. The first path includes a diode 84 poled to conduct negative going signals by way of a charging resistor 86 to charge, with respect to ground, a capacitor 88 negatively at its top plate as shown in FIG. 3. The top plate of capacitor 88 is further connected by way of a discharge resistor 90 to the inverting input of an additional operational amplifier 92. Amplifier 92 is connected as an inverting amplifier and has its noninverting input connected to ground and is provided with a suitable feedback resistor 93 connected between its output and its inverting input.

Resistors 86 and 90 along with capacitor 88 form a modified sample-and-hold circuit in which the capacitor charging time is much faster than its discharge time. To this end, resistor 90 will be much larger than resistor 86 and in one particular embodiment the values of the two resistors 86 and 90 were, respectively 100 ohms and 221K ohms. Thus, it is seen that with the occurrence of a negative going signal at the output of the amplifier 74, capacitor 88 will rapidly charge to approximately the value of that negative going signal and will, when the negative going signal at the output amplifier 74 disappears, discharge relatively slowly through resistor 90 as an input to the operational amplifier 92.

The second path from the output of amplifier 74 is by way of a resistor 94 serving as an input resistor to the inverting input of an inverting operational amplifier 96. This amplifier has its noninverting input connected to ground and is provided with a feedback resistor 98 connected between its output and its inverting input. The output of the amplifier 96 is a signal representing the inversion of the positive going output signal of the amplifier 74 and is applied by way of a diode 100, poled to conduct negative going signals, and a charging resistor 102 to a second capacitor 104 connected between resistor 102 and ground. The junction of resistor 102 and capacitor 104 is connected to one end of an additional discharging resistor 106 the other end of which also serves as an input to the inverting input of amplifier 92.

The output of operational amplifier 92 is a signal which is proportional to the average field current and may be used directly as the output of the signal development means 29 of FIG. 2. Preferably, however, the output of amplifier 92 is further enhanced by the action of an additional amplifying circuit. This additional amplifying circuit includes an input resistor 107 connected to the inverting input of an operational amplifier 108 which has its noninverting input connected to ground by way of a resistor 110. A feedback path between the output of the amplifier 108 and its inverting input includes a series combination of a capacitor 112 and a resistor 114. The inverting input of amplifier 108 is provided with an additional signal in the form of a reference voltage which is illustrated as being derived from a potentiometer 116 connected between a source of negative voltage ($-V$) and ground. The wiper arm of potentiometer 116 is connected by way of a resistor 118 to the inverting input of amplifier 108. Operational amplifier 108 and its associated circuitry acts as a d.c. amplifier having an extremely high gain and compares the signal applied by way of resistor 118 to that supplied by input resistor 107 to provide an output (line 56) which is the control signal. In FIG. 2, for example, the signal on line 56 is utilized for governing the operation of the phase control 50.

Figure 4A:
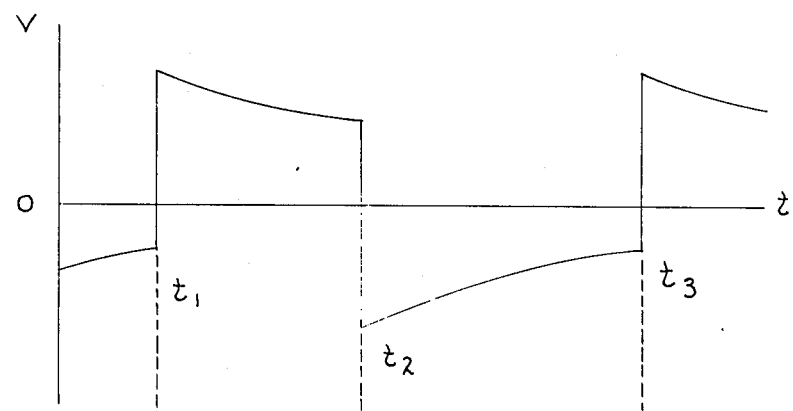
FIG. 4 illustrates certain voltage waveforms which exist in the circuitry of FIG. 3 and which are helpful in understanding the present invention.
Figure 4B:
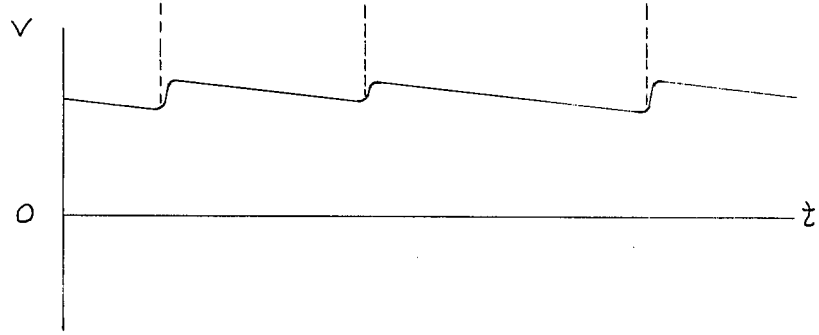

The operation of the circuitry of FIG. 3 may be best understood when viewed in conjunction with FIGS. 4a and 4b which illustrate the two principal voltage waveshapes occuring within the circuitry. It will be remembered that the primaries 53 and 54 were previously stated to be connected in mutual opposition and for purposes of this example it will be assumed that the control of the thyristor 48 of FIG. 2 is such so that the free-wheeling time is longer than the conduction time of the thyristor 48. Because of the inductive nature of the load, the load current will be continuous but because of the opposed nature of the current in the primaries 53 and 54 the output of transformer secondary 55 will be relatively positive and negative going as shown in FIG. 4a which plots voltage against time. At $t_1$ time (FIG. 4a) thyristor 48 of FIG. 2 is rendered conductive and the current in primary 53 will produce a positive going signal at the output of the transformer. This signal will rise to a peak and slowly decay towards some value until, at time $t_2$, thyristor 48 is rendered nonconductive. Time $t_2$ is the beginning of the free-wheeling period and current will circulate in the load through the free-wheeling path between times $t_2$ and $t_3$. At time $t_3$ thyristor 48 will again be rendered conductive. During the free-wheeling period, current through primary 54 will induce an output in the secondary winding 55 which is negative going and basically similar in appearance (although inverted) to that due to the current in primary 53 but extending for a longer period of time.

The transformer output shown in FIG. 4a is applied to amplifier 74 and the output of that amplifier will be, essentially, a scaled, inverted replica of FIG. 4a. The outputs of amplifier 74 are such that, in the illustrated embodiment, the signal resulting from the normal power conduction path; i.e., primary 53, will be a relatively negative signal and this signal will be applied via diode 84 and resistor 86 to the capacitor 88 to charge that capacitor negative at its top plate. The free-wheeling current by way of primary 54 will be seen as a positive going signal at the output of amplifier 74 which, when inverted by operational amplifier 96, will be passed by diode 100 and resistor 102 to charge capacitor 104 negatively with respect to ground.

As previously indicated, the two capacitors 88 and 104 have a very fast charge time and a relatively slow discharge time and serve as inputs to the inverting amplifier 92. This amplifier will receive each of these signals and the output of amplifier 92 will appear similar to that shown in FIG. 4b which also plots voltage against time. The output of amplifier 92 is essentially a d.c. signal having relatively small peaks or ripple and is proportional to the average value of the field current. As previously explained, this signal is further defined by the comparator amplifier 108 to be provided as an output signal to the control means which, as previously indicated, will be appropriate to the type of power supply and control utilized.

Figure 7:
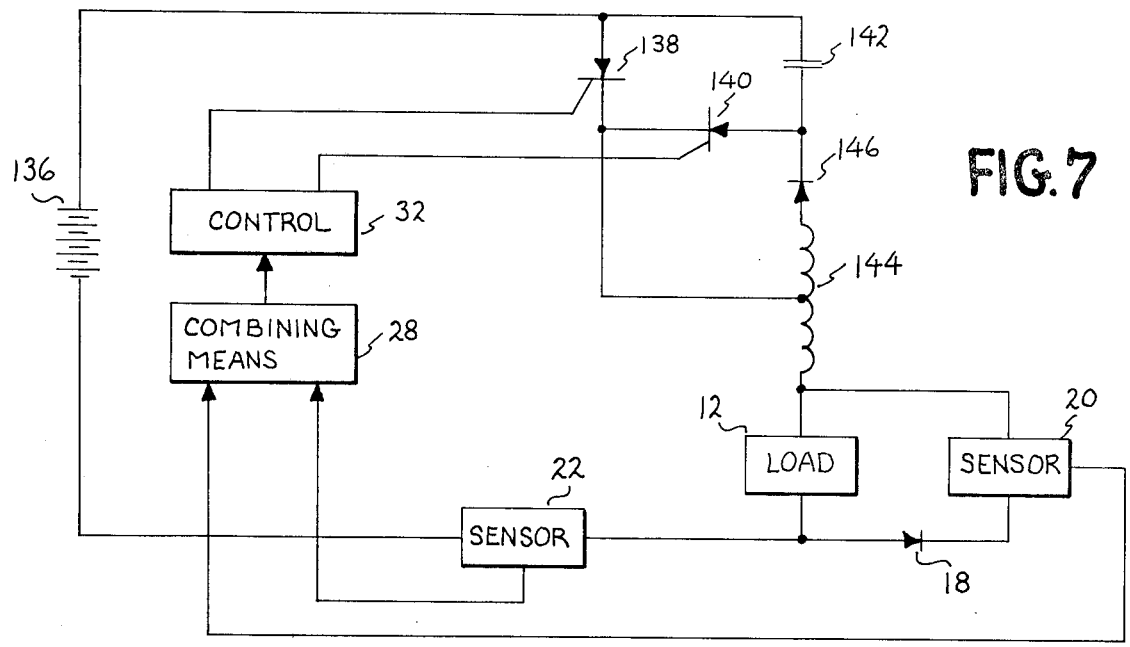
FIGS. 5, 6 and 7 are schematic diagrams, partially in block form, illustrating the application of the present invention to, respectively, two-third wave, full-wave and d.c. chopper drives.
Figure 5:
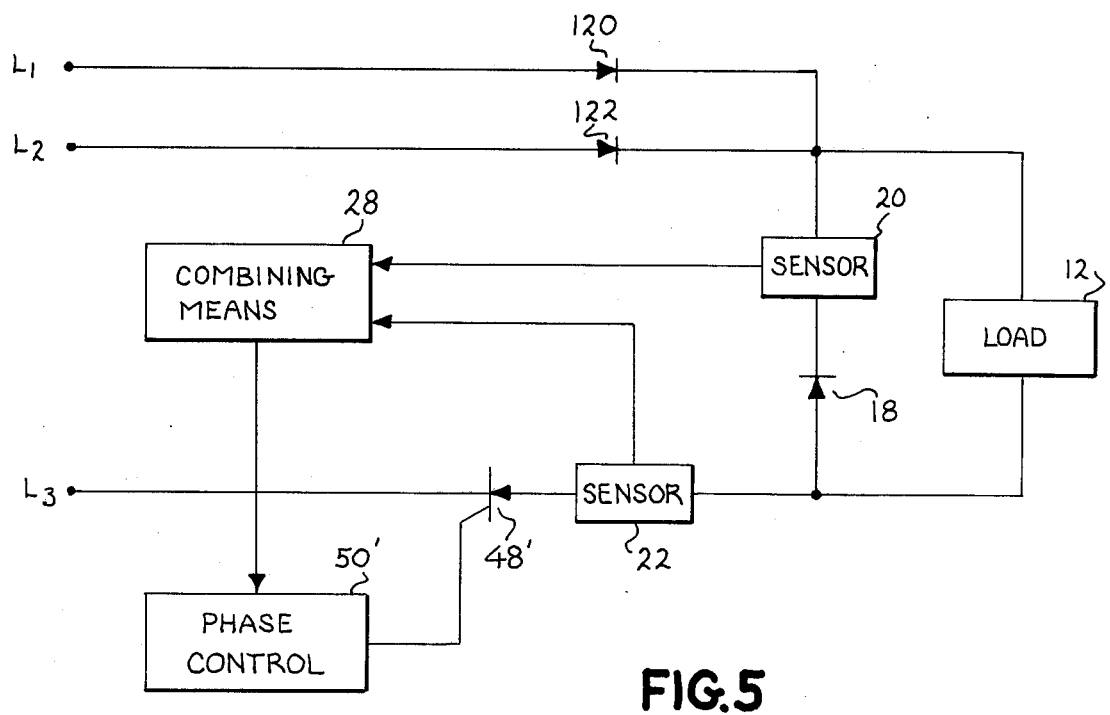
Figure 6:
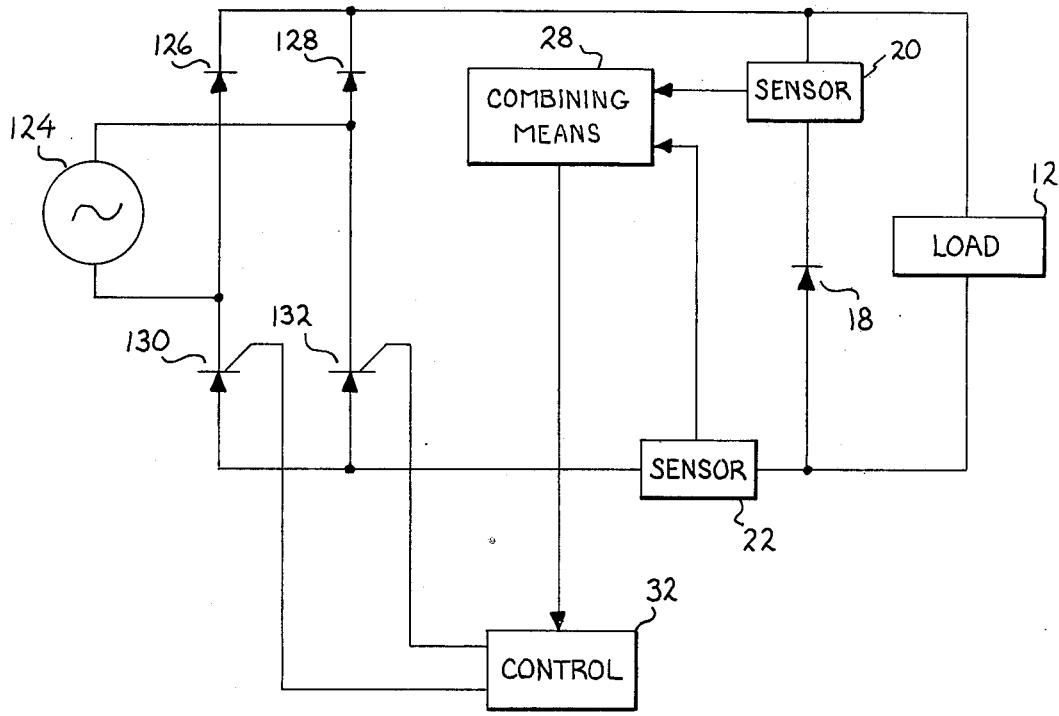

FIGS. 5, 6 and 7 illustrate, in block form, the application of the present invention to other forms of power supplies. Insofar as is practical, the components of these figures will be designated with the same designations as were utilized with respect to FIGS. 1 and 2.

In FIG. 5 there is shown the application of the present invention to what is commonly referred to as a two-thirds wave drive. This drive is very similar to that shown and described in FIG. 2 excepting that instead of using single phase a.c. power, the power source here employed is three-phase as illustrated by the terminals $L_1$, $L_2$ and $L_3$. Terminals $L_1$ and $L_2$ are connected to the load 12 by a pair of diodes 120 and 122, respectively. The rest of the depiction of FIG. 5 is essentially the same as that of FIG. 2 with the thyristor controlling the power to the load 12 being designated by 48' and the phase control being designated 50'. The prime notation is here utilized realizing that although the principles of operation are identical with those of FIG. 2, the actual components employed might be different. In this drive, power is supplied to the load 12 from terminal $L_1$ or $L_2$ through its respective diode depending upon which of these lines is more positive at any particular instant. The return path from the load is, in each case, back to terminal $L_3$. As before, a free-wheeling path is achieved by way of a diode 18 and a sensor 20. The second sensor is located between the load and terminal $L_3$ outside of the free-wheeling path as previously described.

FIG. 6 illustrates the application of the present invention to a full-wave rectification bridge supplying the load from a single phase a.c. source 124. Source 124 is connected to the full-wave rectification bridge which comprises two diodes 126 and 128 and a pair of thyristors 130 and 132. This bridge configuration is well known and no further explanation is believed necessary. The rest of the depiction of FIG. 6 is identical to that of FIG. 1 with the exception that the control 32 now supplies appropriate gating pulses to each of the thyristors 130 and 132 to phase control the initiation of the conduction of these thyristors. An obvious modification of this circuit would employ a bridge utilizing four thyristors.

FIG. 7 illustrates the application of the present invention to a d.c. chopper circuit. This chopper circuit is of the kind referred to as a "Jones Chopper" which may be found and explained in more detail on page 371 of *SCR Manula, 5th Edition*, copyright 1972 by General Electric Company, U.S.A. As is known, the chopper is supplied from a d.c. source shown here as a battery 136 which has its positive terminal connected to the load 12 by way of a controlled rectifier or thyristor 138. The cathode of thyristor 138 is connected to the cathode of a second controlled rectifier or thyristor 140 and a commutating capacitor 142 is connected between the anodes of the thyristors 138 and 140. The cathodes of thyristors 138 and 140 are connected to the load by way of a center tapped inductor 144 which has one end thereof connected to the anode of a diode 146. The cathode of diode 146 is connected to the junction of capacitor 142 and the thyristor 140. The other end of the inductor 144 is connected to the load 12 and the other side of the load 12 is connected through sensor 22 to the negative battery terminal. The free-wheeling path is provided around the load in a manner similar to that earlier described and includes a diode 18 and a second sensor 20. Sensors 20 and 22 each provide signals functionally related to the current in their respective paths to a combining means 28 which in turn supplies a signal to the control 32 for governing the operation of the thyristors 138 and 140. The actual operation of the chopper circuit is believed well known and further explanation is believed here unnecessary. Suffice it to say that the chopper circuits, like the a.c. circuits described above, provide times during which no power is applied from the source to the load to define a free-wheeling time. The development of the signal to control the operation of the chopper thyristors is identical.

Thus, it is seen that there have been shown and described accurate and inexpensive circuits for monitoring an average load current of an inductive load which is provided with the free-wheeling path. The results of the monitored current may, if desired, be utilized as a feedback signal to control application of power to the load.

While there have been shown and described what are at present considered to be the preferred embodiments of the invention, modifications thereto will readily occur to those skilled in the art. For example, only certain types of power supplies have been shown and it is obvious that other types which are intermittent in their operation could be utilized employing the present invention with equal facility. It is also noted that the two modified sample-and-hold circuits illustrated in FIG. 3 both responded to negative going signals. The use of different types of sample-and-hold circuits or sample-and-hold circuits responsive to positive and negative going signals with the appropriate inputs to the two input terminals of the following inverting amplifier are believed well within the application ability of one skilled in the art. In addition, although the only specific load shown was a motor field, the invention has equal applicability to other inductive loads such as brake coils, magnets, etc. It is, therefore, not intended that the present invention as claimed hereinafter be limited to the specific embodiments shown but that the claims be given their full intent in accordance with the scope of the invention.

What is claimed is:

1. A circuit for generating an output signal proportional to the average current of an inductive load intermittently supplied power from a source comprising:
   (a) means to provide a free-wheeling path through which load current may flow during periods when said source is not connected to said load;
   (b) first means to produce a first signal which is a function only of the current in said free-wheeling path;
   (c) second means to produce a second signal which is a function only of the current supplied to said load from said source; and,
   (d) means to combine said first and second signals to provide said output signal proportional to the average load current.

2. A circuit for providing an output signal proportional to the average current flowing in a load to which electrical power is intermittently applied from a source comprising:
   (a) a current path associated with said load operative to conduct current only during periods when the source is not supplying power to the load, said path including first means to develop a first signal which is a function of the load current therein;
(b) second means intermediate the source and the load operative to develop a second signal which is a function of the load current only during periods when power is being supplied to the load from said source; and,
(c) means for combining said first and second signals to develop said output signal.

3. The invention in accordance with claim 2 wherein said first and second means comprise, respectively, first and second primary transformer windings and said means for combining includes a secondary transformer winding coupled to said primary windings.

4. The invention in accordance with claim 3 wherein said primary windings are connected mutually opposed.

5. A motor control circuit including a path for providing a feedback signal proportional to the average current of the motor field winding comprising:
(a) a power source;
(b) control means responsive to the feedback signal for intermittently connecting said source to said field winding whereby the amount of electrical power supplied to said field winding may be controlled;
(c) a free-wheeling current path connected to said field winding, said path carrying field winding current only during periods when said winding is not connected to said source;
(d) means within said free-wheeling current path operative to provide a first signal which is a function of the current in said path;
(e) means for providing a second signal which is a function of the current in said field winding only when said source is supplying power to said winding;
(f) means for combining said first and second signals to provide said feedback signal; and,
(g) means to connect said feedback signal to said control means.

6. The invention in accordance with claim 5 wherein said means to provide said first and second signals comprise, respectively, first and secondary primary transformer windings and wherein the means for combining includes a transformer secondary winding coupled to said primary windings.

7. The invention in accordance with claim 6 wherein the primary windings are connected in relatively opposed directions.

8. The invention in accordance with claim 7 further including a sample-and-hold circuit connected to the output of the transformer secondary winding.

9. The invention in accordance with claim 7 further including first and second sample-and-hold circuits connected to the output of the transformer secondary winding to receive, respectively, representations of the signals coupled to said secondary winding from said first and second primary windings.

10. The invention in accordance with claim 9 further including amplifying means coupled to said first and second sample-and-hold means for producing said feedback signal.

11. A control circuit, for a d.c. motor having a field winding which is intermittently supplied with electrical power from a source, comprising:
(a) a free-wheeling path for carrying field winding current only during periods during which power is not being supplied to said field winding;
(b) means to sense the value of the current in said free-wheeling path and to provide a first output signal which is a function of this current;
(c) means to sense the value of the field winding current only during periods when power is being furnished to said field winding and to provide a second output signal which is a function of this current; and,
(d) means to combine said first and second output signals to produce a feedback signal for controlling the power supplied to said motor.

12. A circuit for controlling the electrical power supplied to an inductive load from a source comprising:
(a) selectively operable switching means disposed intermediate said source and said load for intermittently connecting said source to said load;
(b) a circuit connected across said load operative to conduct load current solely during periods when said load is not connected to said source, said path including means to generate a first output signal which is a function of the current in said path;
(c) means intermediate said switching means and said load to generate a second output signal which is a function solely of the load current when said source and said load are connected;
(d) means to combine said first and second output signals to generate a feedback signal proportional to the average load current; and,
(e) means to supply said feedback signal to said switching means for varying the operation thereof to thereby control the amount of power supplied to said load from said source.

13. The invention in accordance with claim 12 wherein said load is a d.c. shunt motor field.

14. A circuit for controlling the electrical power supplied to an inductive load from a source comprising:
(a) selectively operable switching means disposed intermediate said source and said load for intermittently connecting said source to said load; and,
(b) means for controlling the operation of said switching means as a function of the current through said load comprising:
(1) circuit means for conducting load current only during first periods when the source and load are not connected including means to provide a first output signal which is a function of the load current during said first periods,
(2) means for providing a second output signal which is a function of the load current only during second periods during which said load is connected to said source,
(3) means to combine said first and second output signals to provide a feedback signal proportional to the average value of the load current, and,
(4) means for supplying said feedback signal to said switching means whereby the relative length of on to off time of said switching means is varied.

15. The invention in accordance with claim 14 wherein said source is single phase a.c. and said switch means provides half wave rectification.

16. The invention in accordance with claim 14 wherein said source is three phase a.c. and said switch means provides two-thirds wave rectification.

17. The invention in accordance with claim 14 wherein said source is a.c. and said switch means provides full wave rectification.

18. The invention in accordance with claim 14 wherein said source is d.c. and said switch means is a chopper.

* * * * *